United States Patent [19]
Lee

[11] Patent Number: 5,941,342
[45] Date of Patent: Aug. 24, 1999

[54] FOLDING STAIRCASE

[75] Inventor: Byung-tae Lee, Chungcheongbuk-do, Rep. of Korea

[73] Assignee: APC Industrial Co., Ltd., Chungcheongbuk-do, Rep. of Korea

[21] Appl. No.: 09/018,321

[22] Filed: Feb. 3, 1998

[30] Foreign Application Priority Data

Jul. 7, 1997 [KR] Rep. of Korea ............... 97-17867

[51] Int. Cl.$^6$ ..................................... B60R 3/02
[52] U.S. Cl. ..................... 182/95; 182/127; 280/166
[58] Field of Search ................... 182/95, 96, 91, 182/127, 88, 77; 280/166

[56] References Cited

U.S. PATENT DOCUMENTS 1,228,271  5/1917  Wells .
3,462,170  8/1969  Smith .
4,140,327  2/1979  Hackney .................. 280/163

Primary Examiner—Alvin Chin-Shue
Attorney, Agent, or Firm—Dvorak & Orum

[57] ABSTRACT

A folding staircase comprises a plurality of step units each having a pair of horizontal link bars 41*b*, a pair of vertical link bars 42*b* that are pivotally coupled to corresponding the horizontal link bars, and a plate 20*b* that are connected between the horizontal link bars, wherein the ends of the horizontal link bars are pivotally combined with those of the adjacent vertical link bars to form a step portion, and a fixing unit for fixing the step portion to a vehicle.

6 Claims, 16 Drawing Sheets

5,941,342

FOLDING STAIRCASE

BACKGROUND OF THE INVENTION

1. Field of the Invention

The present invention relates to a folding staircase, and more particularly, to a simple folding staircase which can be installed on vehicles.

2. Description of the Related Art

In general, a staircase provided in a building is made of steel, cement or wood, and steps provided on a transportation vehicle such as an airplane or an automobile are made of a light metal.

A staircase installed on a vehicle can be used not only by passengers to ascend or descend but it can also be used for baggage loading and unloading. The conventional staircase does not fold-up, so that it is installed on the vehicles as needed, and, after it is used, it must be disassembled again. Also, since disassembled staircase is significantly bulky, the loading space for other freight is reduced when the staircase is carried in the vehicle.

SUMMARY OF THE INVENTION

To solve the above problem it is an objective of the present invention to provide a folding staircase which can be installed conveniently and folds up compactly when not in use.

To accomplish the above object, there is provided a folding staircase comprising a plurality of step units each having a pair of horizontal link bars, a pair of vertical link bars that are pivotally coupled to corresponding the horizontal link bars, and a plate that are connected between the horizontal link bars, wherein the ends of the horizontal link bars are pivotally combined with those of the adjacent vertical link bars to form a step portion, and a fixing unit for fixing the step portion to a vehicle.

The fixing unit comprises: a pair of support members for supporting an upper-most step unit of the step portion; and a hinge installed on the upper end of each of the support members, and coupled to a hinge portion of a goods compartment of the vehicle.

According to another aspect of the present invention, the fixing unit comprises: a pair of support members for supporting an upper-most step unit of the step portion; an upper bar whose both ends are combined with the support members, respectively; a hinge which is fixed at a predetermined position of the upper bar, and connected to a hinge portion of a goods compartment of the vehicle; and a moving bracket for fixing the hinge to the predetermined position of the upper bar.

According to still another aspect of the present invention, the fixing unit comprises: a pair of support members each having a slot formed in a lengthwise direction thereon, to which the upper-most step unit of the step portion is combined; a pair of guide members whose one end is pivotally and slidingly coupled to the slot of the support member by a bolt; an upper bar whose both ends are connected to the guide members, respectively; a hook fixed at an arbitrary position of the upper bar, for combining with a hinge edge of the tailgate of the vehicle; and a bracket for fixing the hook to the arbitrary position of the upper bar.

According to yet another aspect of the present invention, the fixing unit comprises: a fixing member fixed on the floor of a goods compartment of the vehicle; a connecting member having one end with which an end of the vertical link bar of the upper-most step unit of the step portion pivotally combines; and a pivot bar whose one end pivotally combines with the fixing member and whose other end inserts into the connecting member.

BRIEF DESCRIPTION OF THE DRAWING(S)

The above objective and advantage of the present invention will become more apparent by describing in detail a preferred embodiment thereof with reference to the attached drawing(s) in which.

DESCRIPTION OF THE PREFERRED EMBODIMENT(S)

Figure 1:
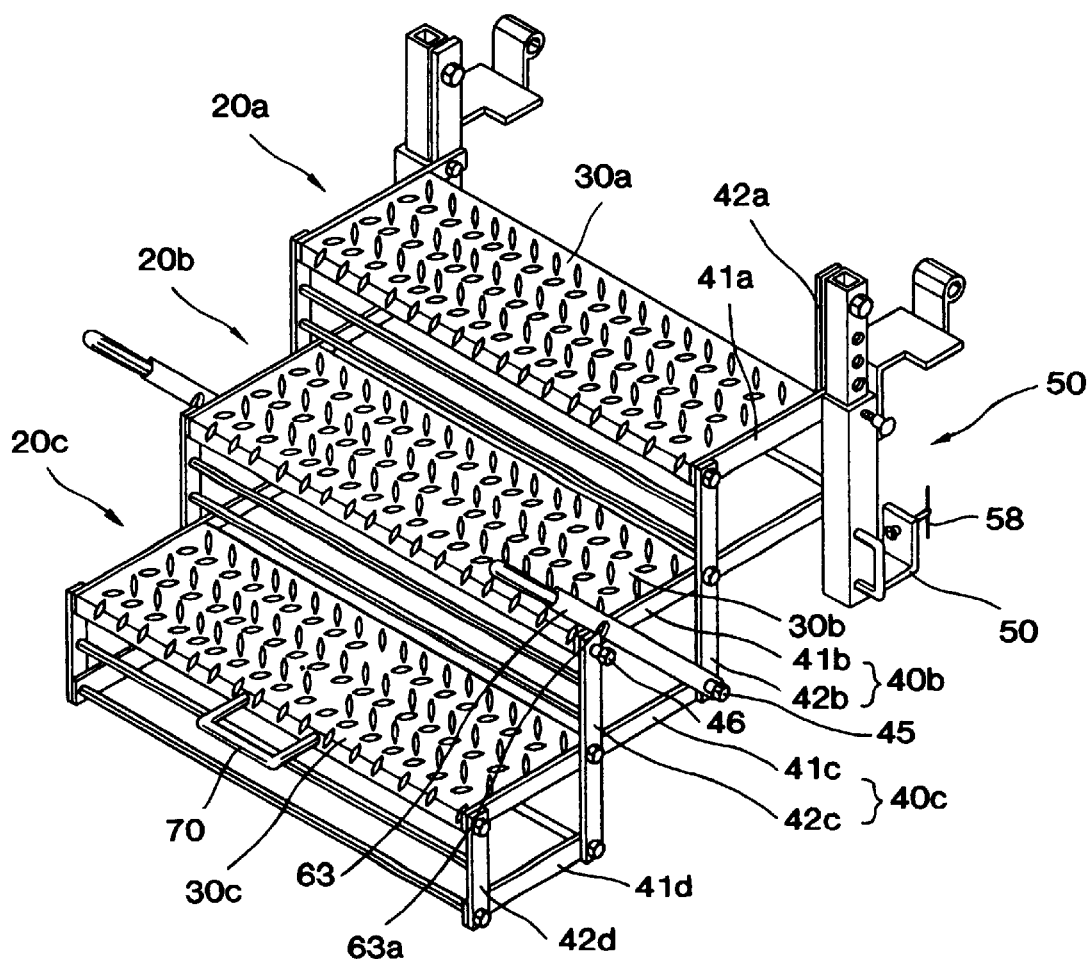
FIG. 1 is a perspective view of a folding staircase according to a first embodiment of the present invention.

Referring to FIG. 1, a folding staircase according to a first embodiment of the present invention is comprised of a step portion and a fixing unit 50 for fixing the step portion on a vehicle.

The step portion includes a plurality of step units 20a, 20b and 20c which are connected to each other and hinged to be capable of folding into each other. The step units 20a, 20b and 20c are comprised of plates 30a, 30b and 30c, pairs of horizontal link bars 41a, 41b and 41c for supporting the plates 30a, 30b and 30c by combining with both ends thereof, and pairs of vertical link bars 42a, 42b and 42c whose centers are rotatably coupled to the centers of corresponding horizontal link bars 41a, 41b and 41c, respectively. The horizontal and vertical link bars 41b and 42b and 41c and 42c constitute cross link bars 40b and 40c, respectively.

The plurality of step units 20a, 20b and 20c are coupled to each other, thereby forming the step portion. That is, the ends of the horizontal link bars 41a, 41b and 41c are pivotally combined with the ends of the vertical link bars 42a, 42b and 42c. At the lower-most step, horizontal and vertical link bars 41d and 42d are pivotally combined to each other.

A fixing lever 63 is pivotally combined with at least one combining pivot 45 where the ends of the horizontal link bars 41b, 41c and 41d are pivotally combined with the ends of the vertical link bars 42b, 42c and 42d, respectively. A hooking groove 63a is formed on the fixing lever 63 to receive a combining pivot 46 opposing the combining pivot 45. As will be described later, when the staircase is extended, the hooking groove 63a of the fixing lever 63 couples to the combining pivot 46, so that the staircase can be maintained in its extended state.

Figure 2:
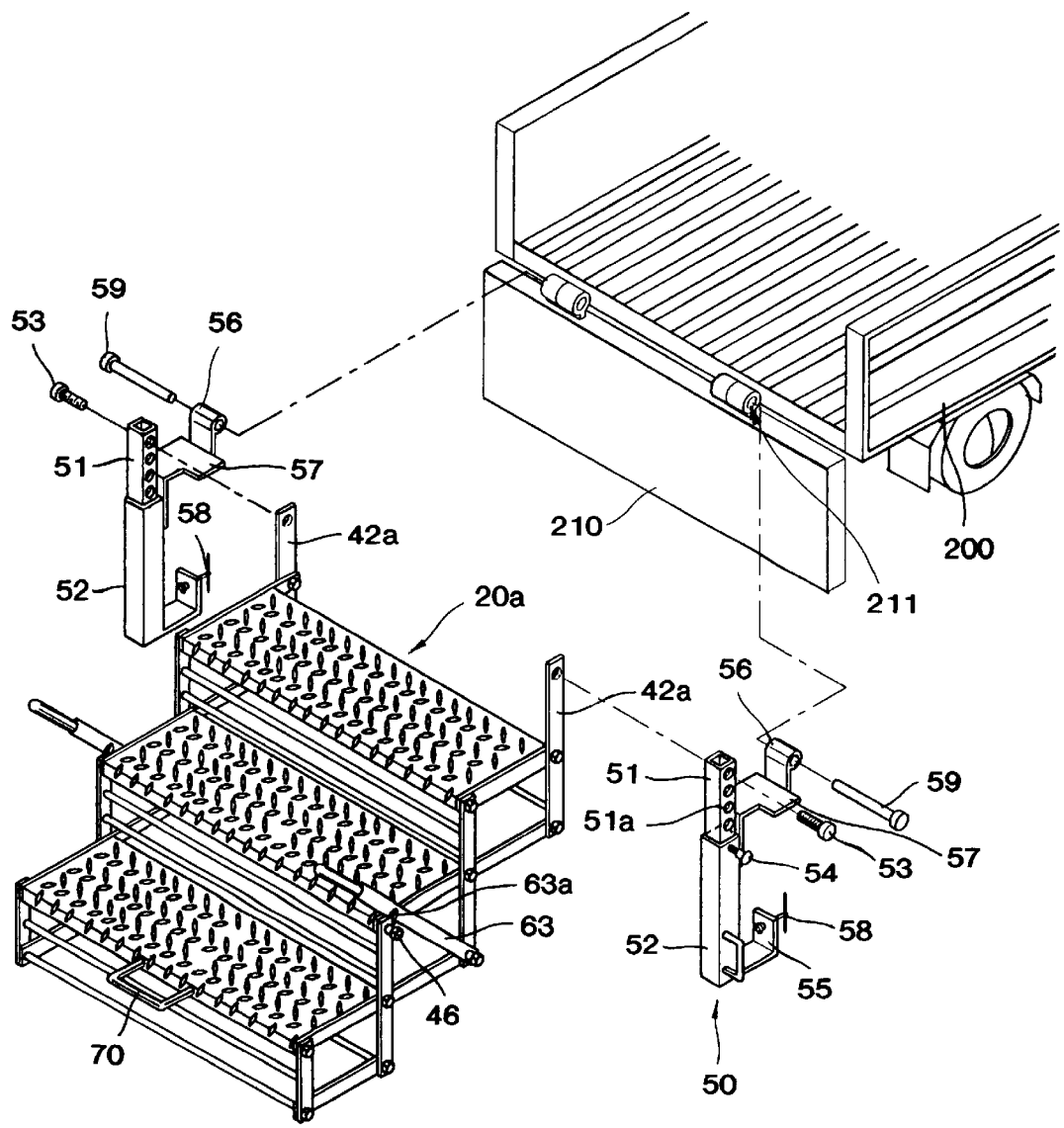
FIG. 2 is an exploded perspective view of a part of the folding staircase shown in FIG. 1.

Also, the upper-most step unit 20a connects to the fixing unit 50 to thus attach to a vehicle such as a pickup truck 200 shown in FIG. 2.

Referring to FIGS. 1 and 2, a tailgate 210 is hinge-combined to a goods compartment 200 of the pickup truck by a hinge portion 211. The fixing unit 50 includes an inserting member 51 with which the vertical link bar 42a of the upper-most step unit 20a is combined, and a support member 52 which is hollow to receive the inserting member 51. The vertical link bar 42a is fixed to the inserting member 51 by a bolt 53. The depth to which the inserting member 51 is inserted into the support member 52 can be controlled by selectively combining a control bolt 54 with control holes 51a. Preferably, a spring (not shown) for elastically biasing the inserting member 51 upward can be installed in the hollow support member 52.

As will be described later, a support bracket 55 to be combined with a free end of the tailgate 210 is formed on the lower end of the support member 52. An upper bracket 57 provided with a hinge 56 extends from the upper end of the support member 52. Also, a screw clamp 58 for supporting the support member 52 on the tailgate 210 is installed on the support bracket 55.

Figure 3:
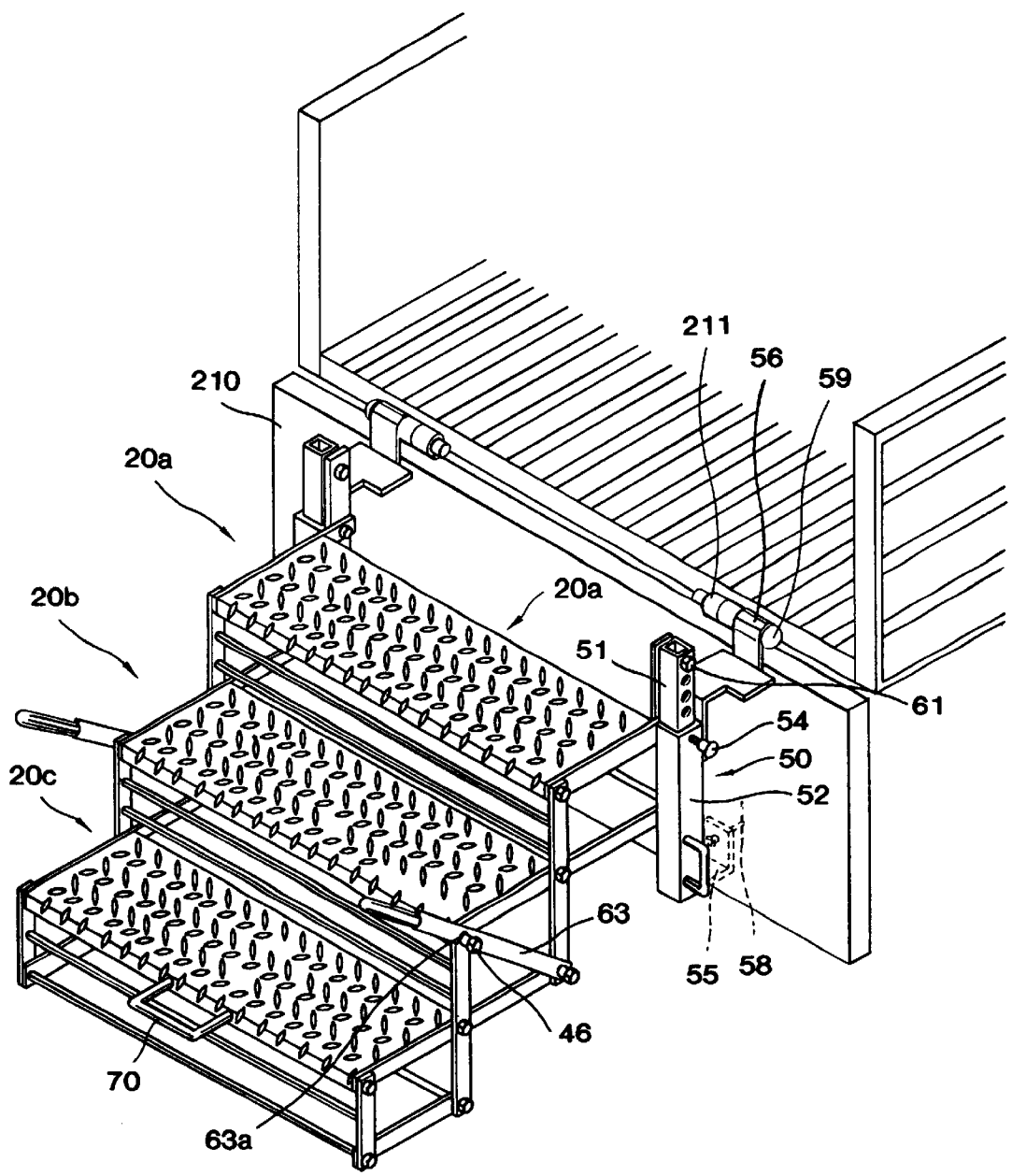
FIG. 3 is a perspective view of the folding staircase shown in FIG. 1 installed on a tailgate of a vehicle in an extended state.

Referring to FIGS. 2 and 3, a method of installing the folding staircase according to the present embodiment will be described. First, the support bracket 55 of the fixing unit 50 to which the step portion is coupled is hooked on the free end of the tailgate 210. In this state, the hinge 56 is connected to the hinge portion 211 of the tailgate 210 by a pin 59.

Then, the screw clamp 58 is turned to tightly secure the fixing unit 50 to the tailgate 210.

FIG. 3 shows the folding staircase in an extended state. Referring to FIG. 3, a handle 70 can be further installed on the lower-most step unit 20c in order to easily extend the folding staircase. Here, the fixing lever 63 pivots to fit the combining pivot 46 into the hooking groove 63a, so that the staircase can be kept stable.

Figure 4:
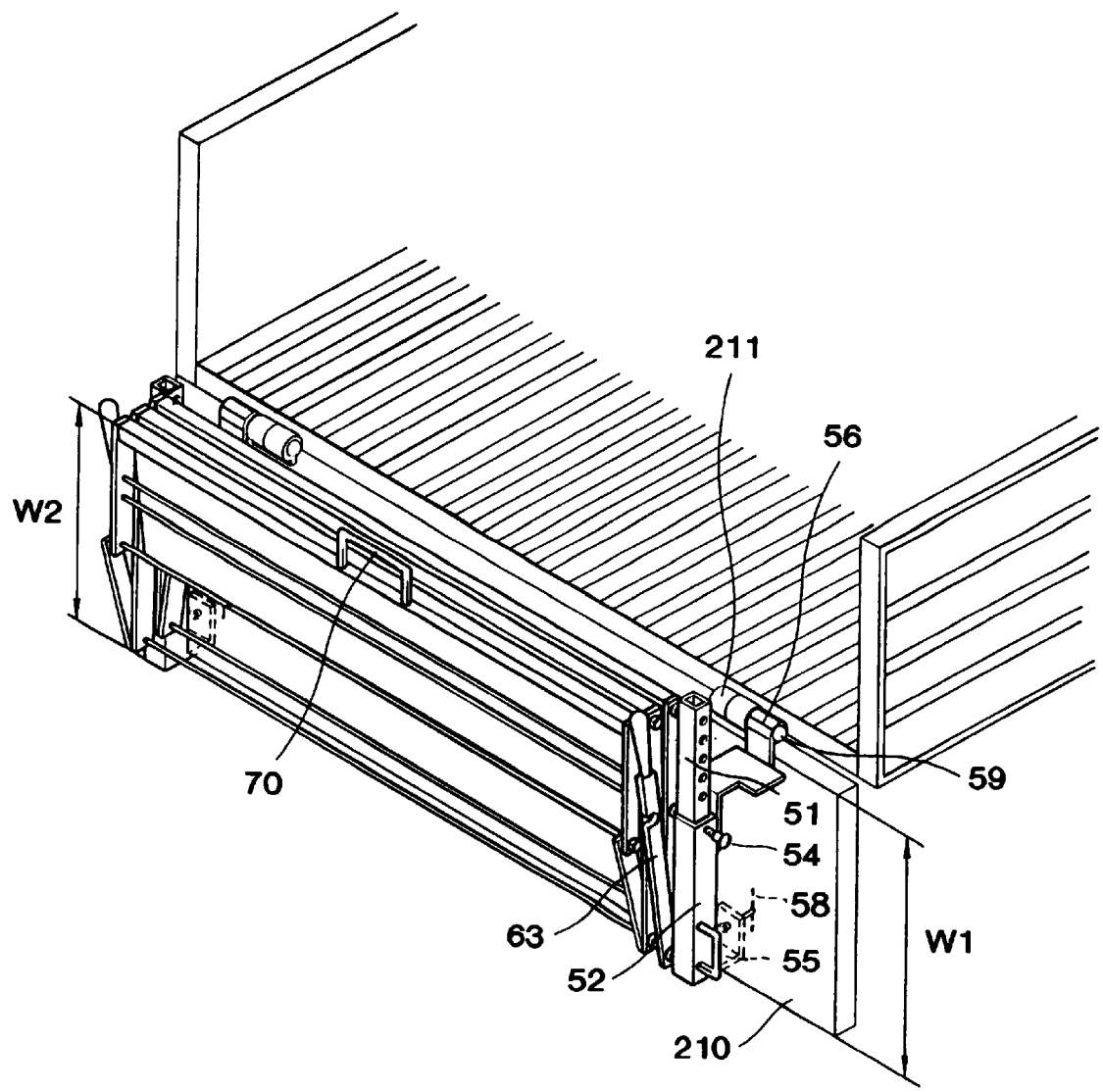
FIG. 4 is a perspective view of the folding staircase of FIG. 1 in a folded state.

When use of the staircase is completed, the fixing lever 63 is rotated to separate the combining pivot 46 from the hooking groove 63a. Then, the staircase is pushed toward the tailgate 210 using the handle 70, and the staircase is folded as shown in FIG. 4. If the width W1 of the compacted staircase is greater than the width W2 of the tailgate 210, the tailgate 210 will not close since the upper end of the staircase prohibits the tailgate 210 from being latched closed.

Figure 5:
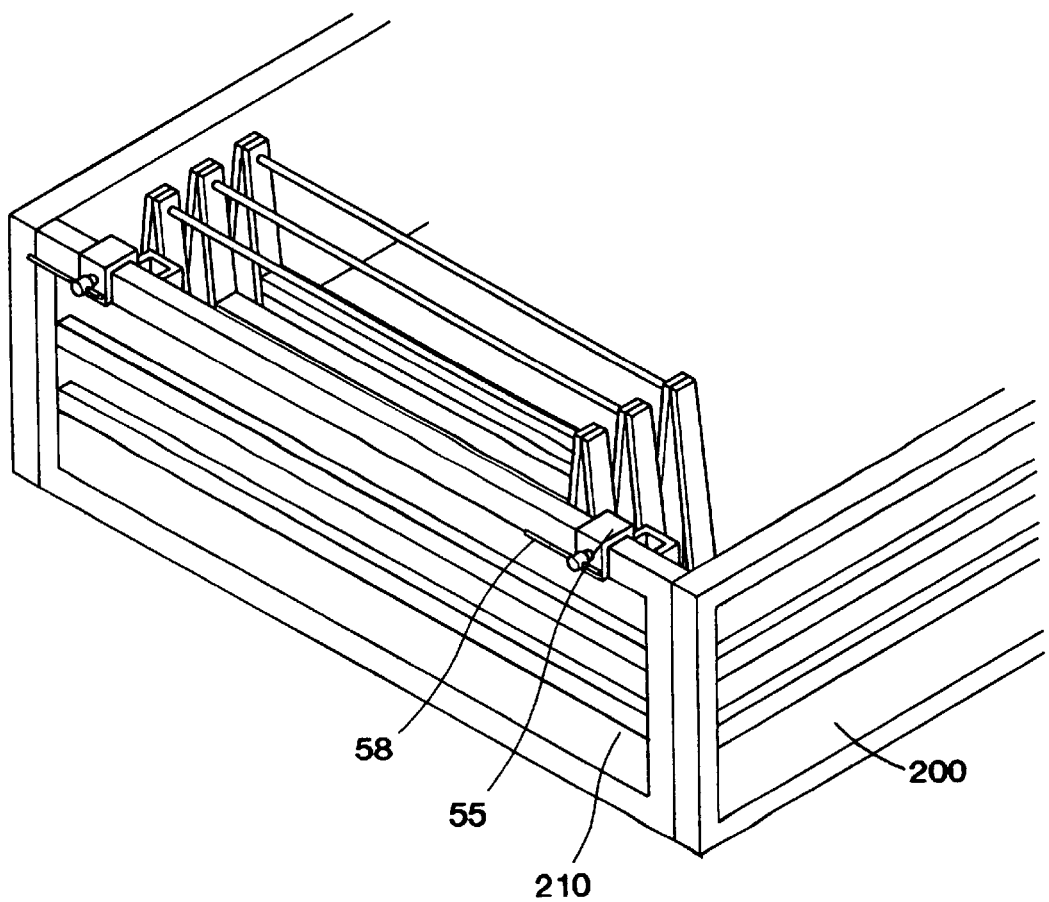
FIG. 5 is a perspective view of a tailgate of a vehicle in latched state in which the staircase of FIG. 4 is folded.

In this case, if the control bolt 54 is pulled out, the inserting member 51 completely inserts into the hollow support member 52, allowing the compacted staircase to have the same height as that of the tailgate 210. Thus, the tailgate 210 can be closed as shown in FIG. 5.

As an alternative, the width W1 of the folded staircase can be the same as the width W2 of the tailgate 210. In this case, the tailgate 210 can be closed without special control operations.

Figure 6A:
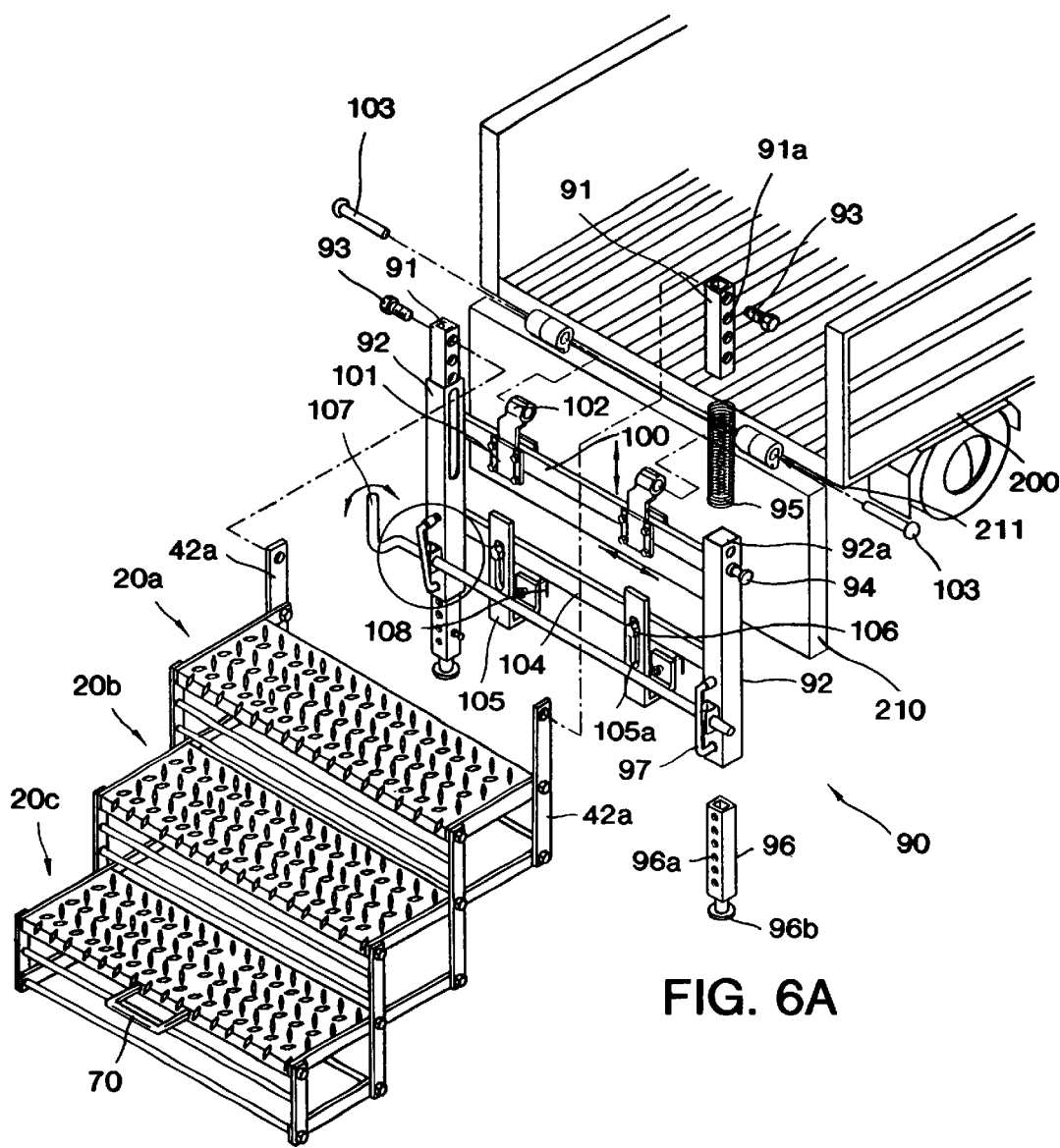
FIG. 6 is a partially exploded perspective view of a folding staircase according to a second embodiment of the present invention.
Figure 6B:
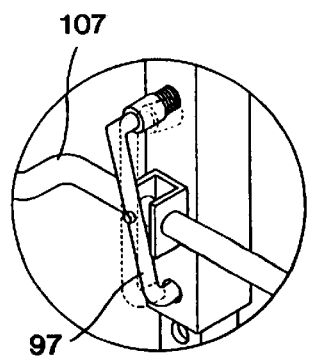

Now, a folding staircase according to a second embodiment of the present invention will be described referring to FIGS. 6 through 9. The same reference numerals as those of previous drawings denote the same elements having identical functions. Referring to FIG. 6, the folding staircase according to the present embodiment is fixed to the tailgate 210 of the goods compartment 200 by a fixing unit 90.

The fixing unit 90 is comprised of a pair of inserting members 91 to which the vertical link bar 42a of the upper-most step unit 20a is connected, and a pair of hollow support members 92 for receiving the inserting members 91. The vertical link bar 42a is fixed to the inserting member 91 by a bolt 93. The depth to which the inserting member 91 is inserted into a hollow 92a of the support member 92 can be controlled by selectively inserting a control bolt 94 into one of several control holes 91a. A spring 95 for elastically biasing the inserting member 91 upward is also included in the hollow 92a of the support member 92.

A ground member 96 is inserted into the lower end of the hollow 92a of the support member 92. The ground member 96 can be supported on the support member 92 by fitting a hook member 97 installed on the support member 92 into through holes 96a. Since the hook member 97 is combined with a lever 107, it can move by rotating the lever 107.

It is preferable that a pad 96b made of rubber is attached at the bottom end of the ground member 96.

Figure 7:
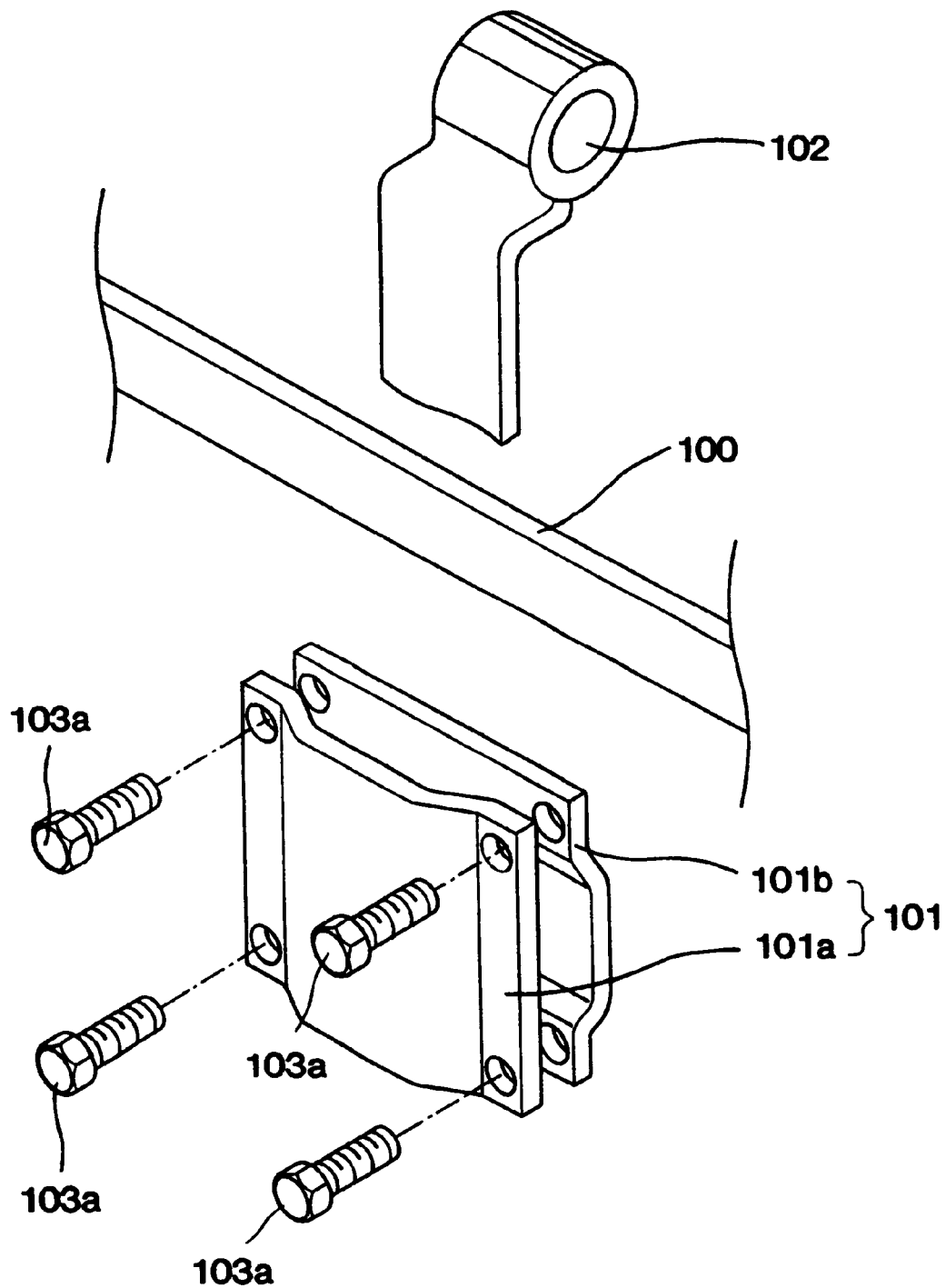
FIG. 7 is an exploded perspective view of the moving bracket and hinge shown in FIG. 6.

The support members 92 are fixed on both ends of an upper bar 100, respectively. A moving bracket 101 and a hinge 102 are installed on the upper bar 100 enabling movement along the upper bar 100. That is, as shown in FIG. 7, the moving bracket 101 is comprised of front and rear bracket pieces 101a and 101b, and the upper bar 100 is interposed therebetween. The front bracket piece 101a has a curved portion into which the hinge 102 is inserted. The moving bracket 101 is appropriately placed according to the position of the hinge 211 of the tailgate 210, and fixing screws 103a are then driven, whereby the moving bracket 101 is fixed on the upper bar 100. At this time, the hinge 102 can be located at an appropriate height since it can move vertically inside the curved portion of the front bracket piece 101a. Therefore, the combination position of the hinge 102 can be controlled according to the type of vehicle.

The hinges 102 are connected to the hinge portion 211 of the tailgate 210 using pins 103.

A lower bar 104 is installed parallel to and under the upper bar 100. Both ends of the upper bar 100 are combined with the support member 92. Two support brackets 105 are installed on the lower bar 104. A slot 105a is formed through the support bracket 105. The support brackets 105 are fixed on the lower bar 104 by screws 106 passed through the slots 105a. Here, the height of the fixed support brackets 105 can be appropriately controlled by moving the support brackets 105 upward or downward along the slot 105a with the screws 106 loosened.

A screw clamp 108 for supporting the fixing unit 90 on the tailgate 210 is installed on each of the support brackets 105.

When the folding staircase according to the present embodiment is installed on a vehicle, the support bracket 105 of the fixing unit 90 to which the step portion is coupled is hooked around the free end of the tailgate 210. In this state, the moving brackets 101 and the hinges 102 are appropriately moved and fixed, and then the hinges 102 are connected to the hinge portions 211 of the tailgate 210 by the pins 103.

Next, the screw clamps 108 are clamped to securely fix the fixing unit 90 to the tailgate 210. The ground member 96 is lowered to be supported on ground, and then the ground member 96 is fixed by the hook member 97. In the present embodiment, the combining pivot 45 and the fixing lever 63 can be eliminated since the ground member 96 securely supports the fixing unit 90 against the ground.

Figure 8:
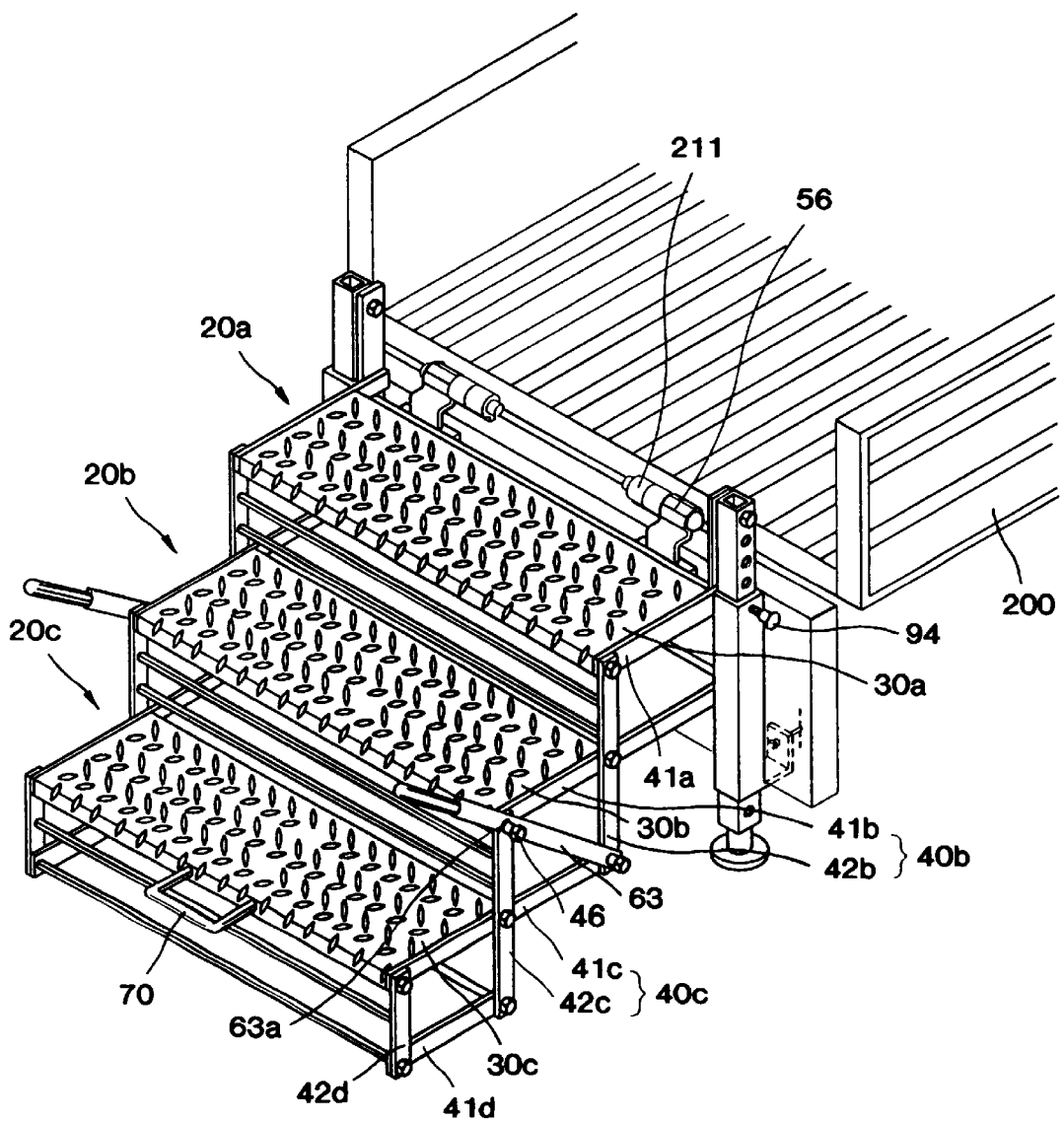
FIG. 8 is a perspective view of the folding staircase of FIG. 6 installed on a tailgate of a vehicle in an extended state.

FIG. 8 shows a folding staircase according to the present embodiment in an extended state.

Figure 9:
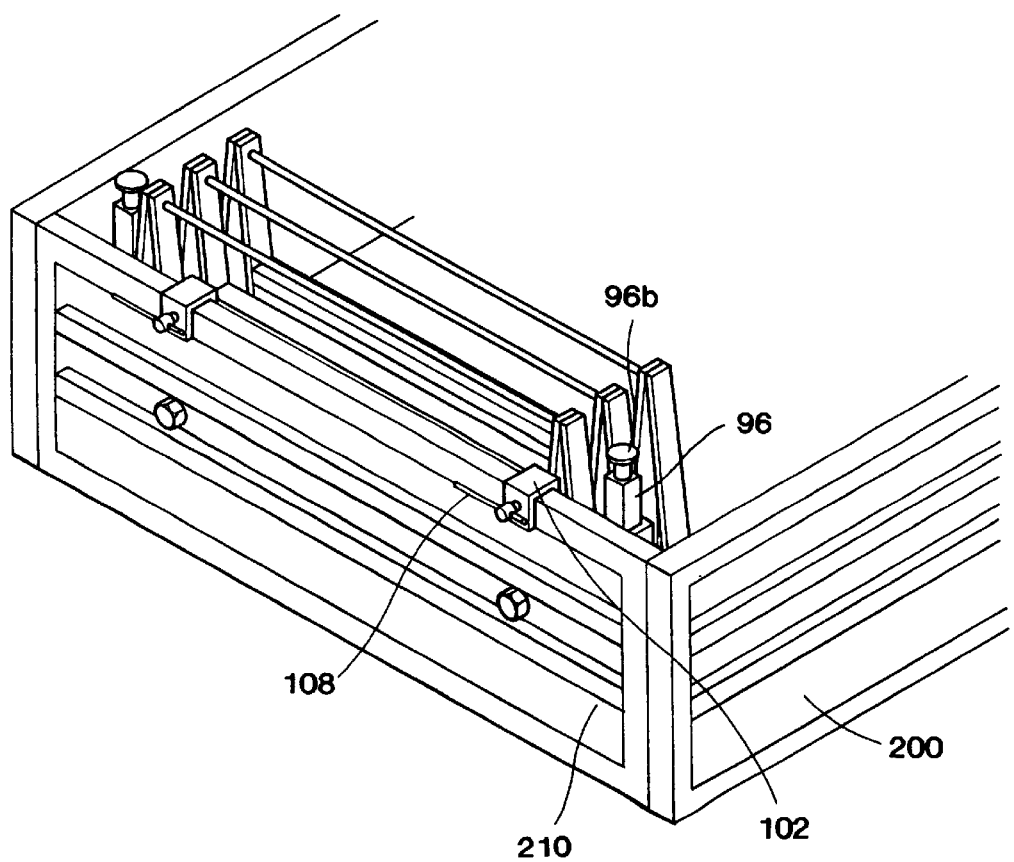
FIG. 9 is a perspective view of a tailgate of a vehicle in a latched state in which the staircase of FIG. 8 is folded.

In this state, the staircase is folded by being pushed toward the goods compartment using the handle 70. In this state, when the control bolts 94 are loosened, the inserting members 91 completely insert into the hollows 92a of the support members 92 due to the weight of the step portion, so that the heights of the upper ends of the folded steps become equal to that of the upper end of the tailgate 210. Accordingly, the tailgate 210 can be closed as shown in FIG. 9. Preferably, the folded step portion can be bound by chains or rope.

A folding staircase according to a third embodiment of the present invention will be described referring to FIGS. 10 through 14. The same reference numerals as those of previous drawings denote the same elements having identical functions.

Figure 10A:
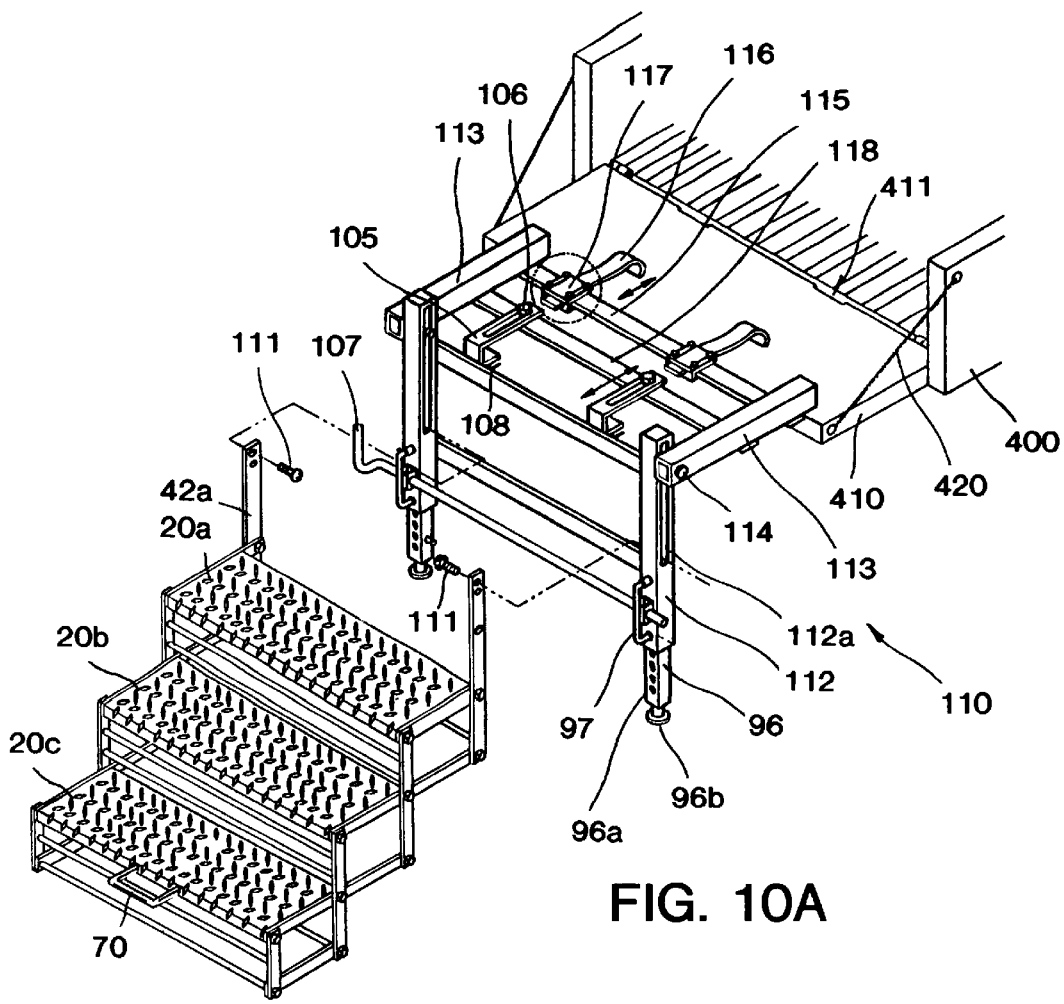
FIG. 10 is a partially exploded perspective view of a folding staircase according to a third embodiment of the present invention.
Figure 10B:
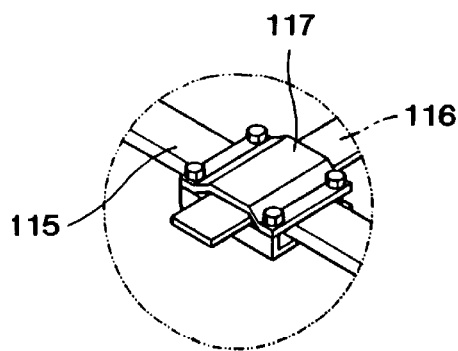

Referring to FIG. 10, the folding staircase according to the present embodiment is fixed on a tailgate 410 of a goods compartment 400 by a fixing unit 110. Here, the tailgate 410 is kept horizontal by chains 420.

The fixing unit 110 includes a pair of support members 112 to which the vertical link bars 42a of the upper-most step unit 20a are coupled, and a pair of guide members 113 which are combined with support members 112 via slots 112a. Hollows (not shown) and the slots 112a are formed through the support member 112, and a bolt 114 passes through the slot 112a. Therefore, the support member 112 and the guide member 113 become pivotally and slidingly combined to each other.

An upper bar 115 is installed between the guide members 113. Hooks 116 are fixed on the upper bar 115 by brackets 117. The hooks 116 are hooked at the edges 411 (hereinafter, called as "hinge edges") of said tailgate 410 hinged to the bottom of a goods compartment 400. The hooks 116 can be appropriately located by moving in the directions indicated by the arrow as shown in the drawing.

A lower bar 116 is installed parallel to and under the upper bar 115. The support brackets 105 coupled to the lower bar 118, screws 106 and screw clamps 108 are the same as those of the previous embodiments, in terms of structure and function.

Also, the structures of the ground member 96, the hook member 97 for fixing the ground member 96, and the lever 107 are the same as those previously described. In the present embodiment, the combining pivot 45 and the fixing lever 63 can be removed, since the ground member 96 securely supports the fixing unit 90 to ground.

In order to install the folding staircase according to the present embodiment on a vehicle, the free end of the tailgate 410 is inserted into the support brackets 105 of the fixing unit 110 combined with a step portion. In this state, the hook 116 is combined with the hinge edges 411 of the tailgate 410, and then the fixing unit 110 is fixed by the brackets 117.

Thereafter, the screw clamp 108 is clamped to tightly fix the fixing unit 110 to the tailgate 410. The ground member 97 descends to be supported by the ground, and is then fixed by the hook 97.

Figure 11:
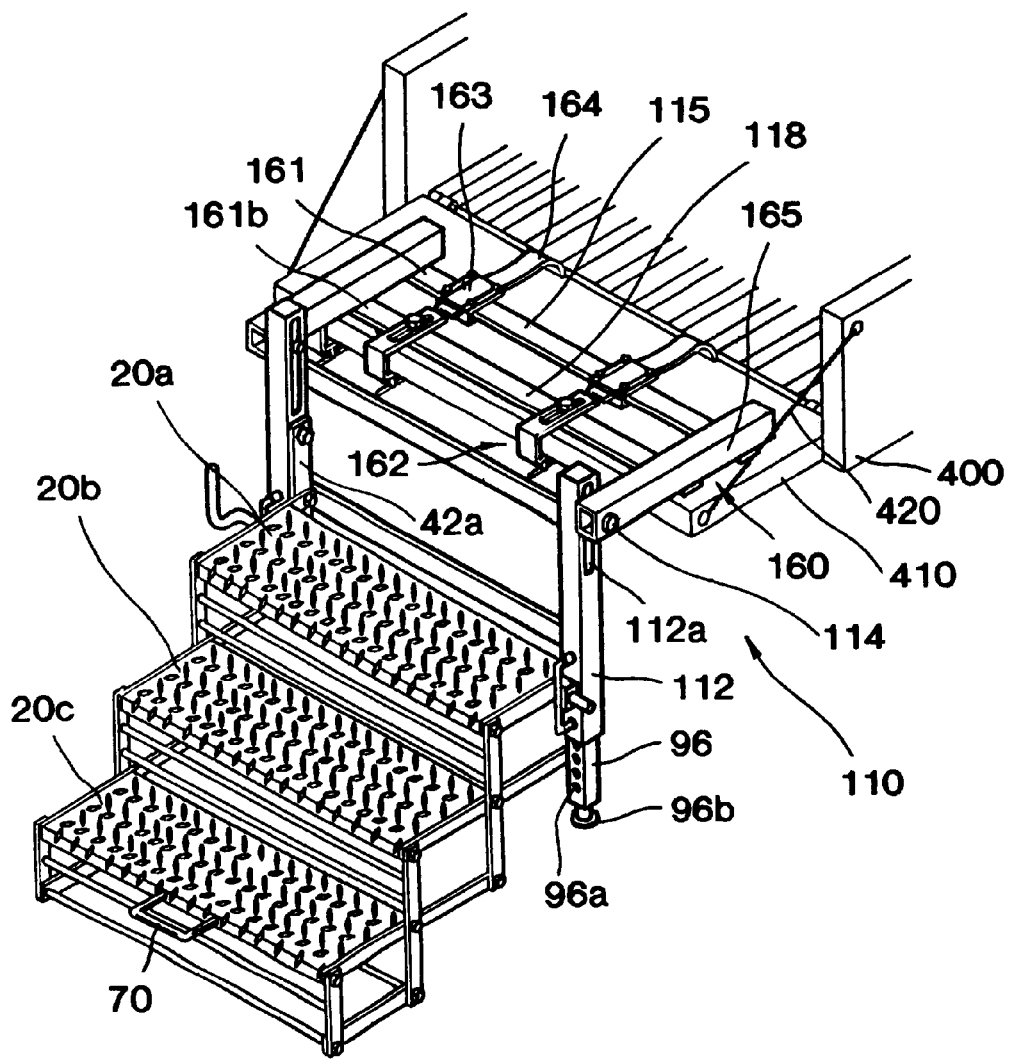
FIG. 11 is a perspective view of the folding staircase of FIG. 10 installed on a tailgate of a vehicle in an extended state.

FIG. 11 shows the folding staircase of the present embodiment in an extended state.

In this state, the staircase is pushed toward the goods compartment using the handle 70, thereby being folded.

Figure 12:
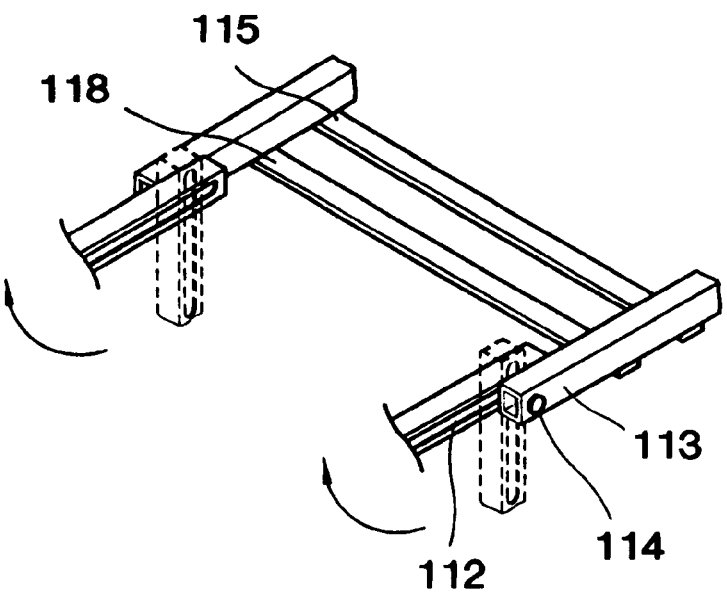
FIGS. 12 and 13 are partial perspective views showing the coupling of the support member and guide member of FIG. 11.
Figure 13:
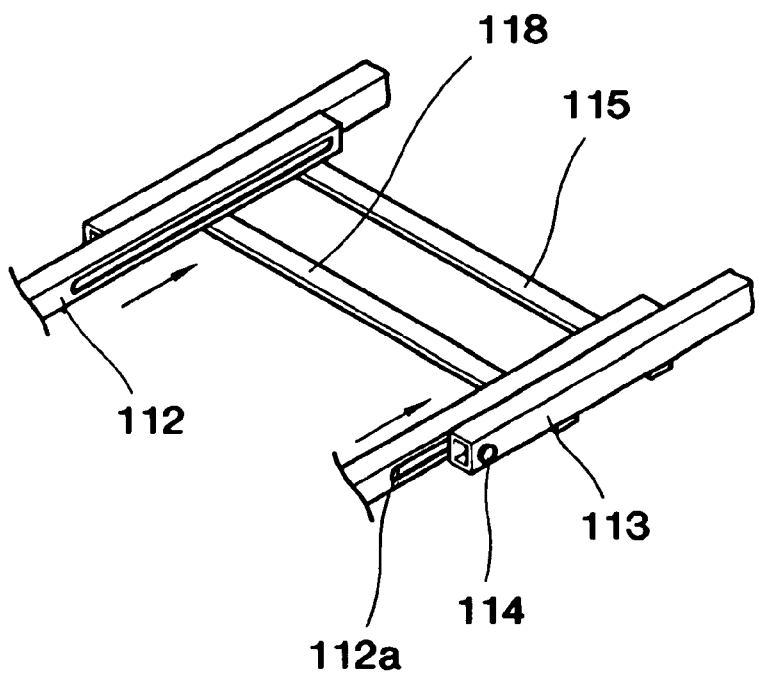
Figure 14:
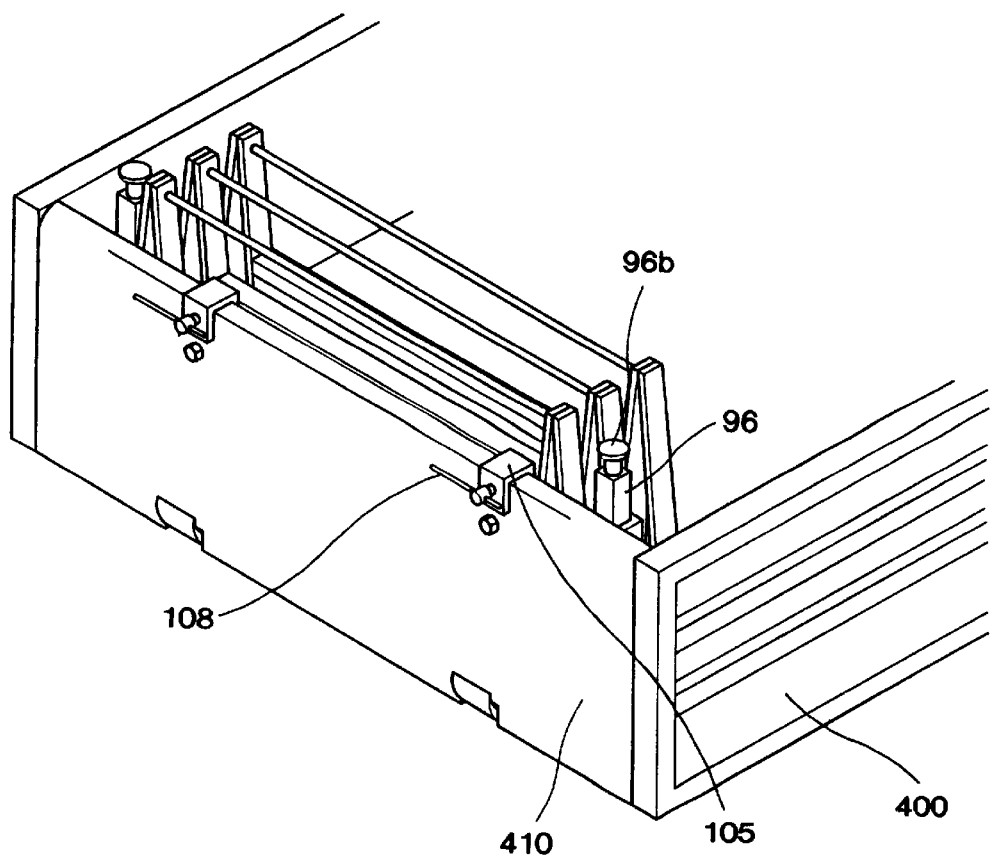
FIG. 14 is a perspective view of a tailgate of a vehicle in a latched state in which the staircase of FIG. 11 is folded.

Next, as shown in FIG. 12, the support members 112 are rotated around the bolt 114 in the direction indicated by the arrows to be parallel to the guide members 113. The support members 112 are then pushed in the direction indicated by the arrows of FIG. 13, thereby completing the folding of the staircase. Then, the tailgate 410 can be closed as shown in FIG. 14.

A folding staircase according to a fourth embodiment of the present invention will now be described referring to FIGS. 15 through 17. The same reference numerals as those of previous drawings shown denote the same elements having identical functions.

Figure 15:
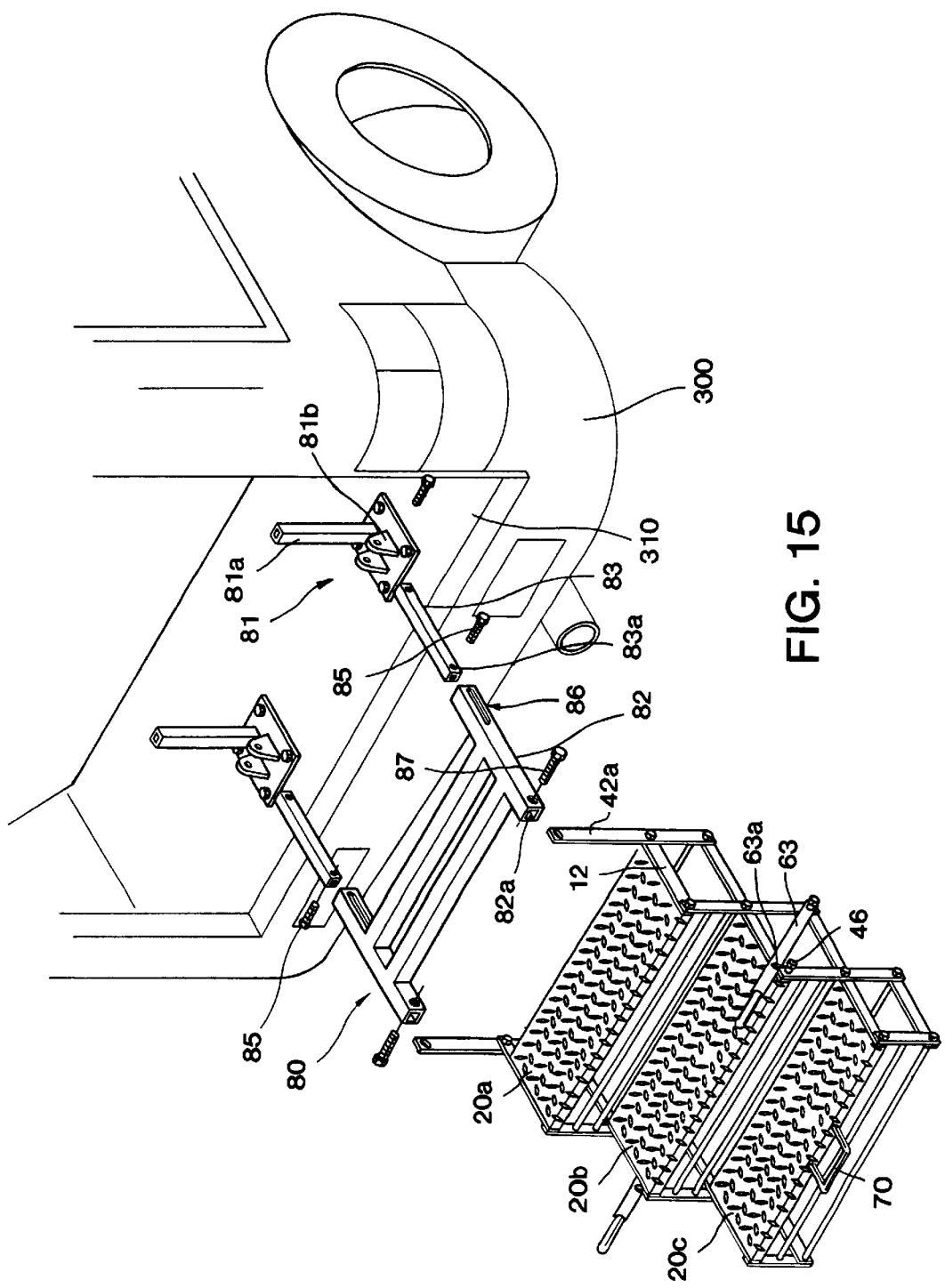
FIG. 15 is a partially exploded perspective view of a folding staircase according to a fourth embodiment of the present invention.
Figure 16:
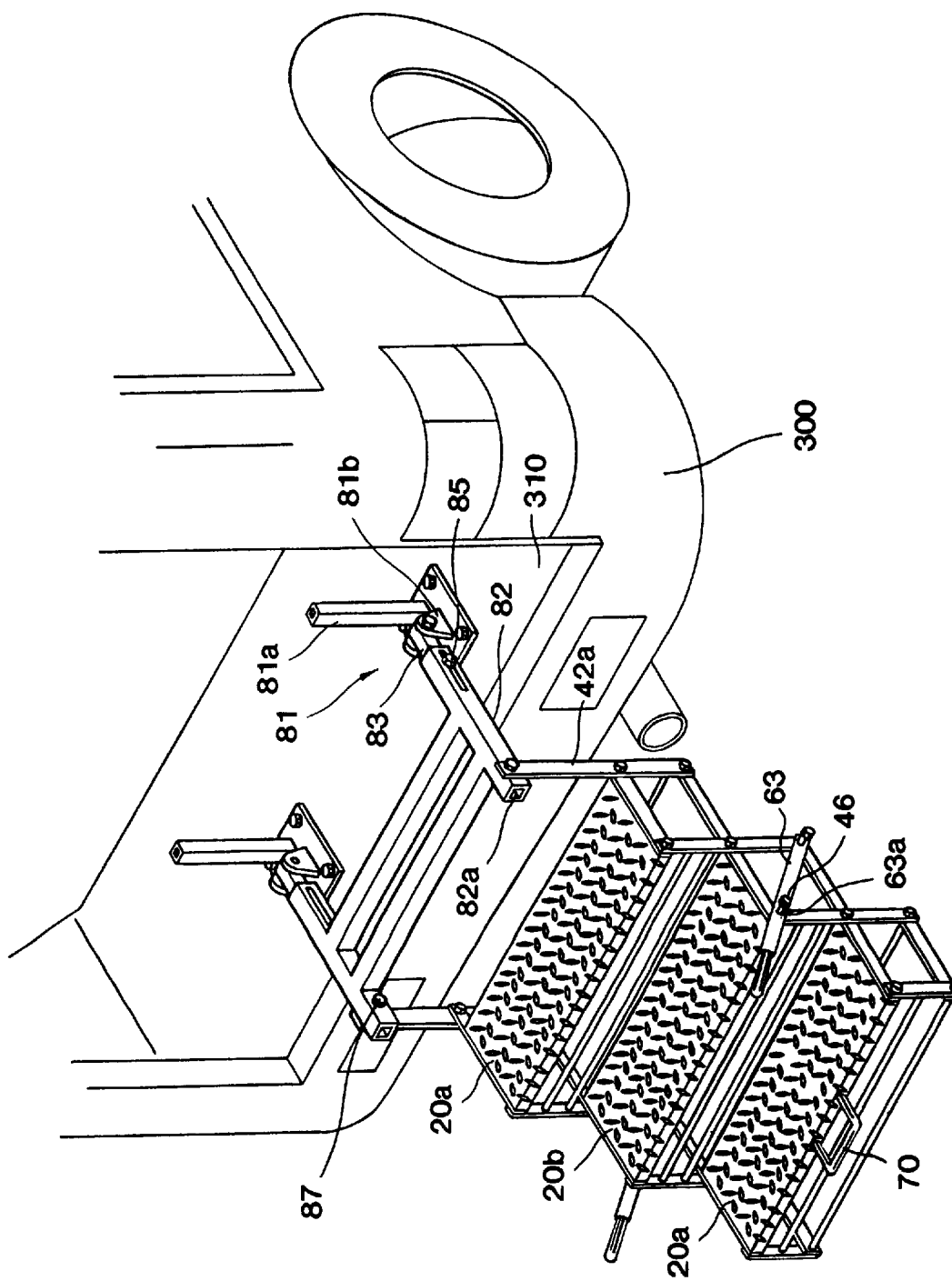
FIG. 16 is a perspective view of the folding staircase of FIG. 15 installed on a tailgate of a vehicle in an extended state.
Figure 17:
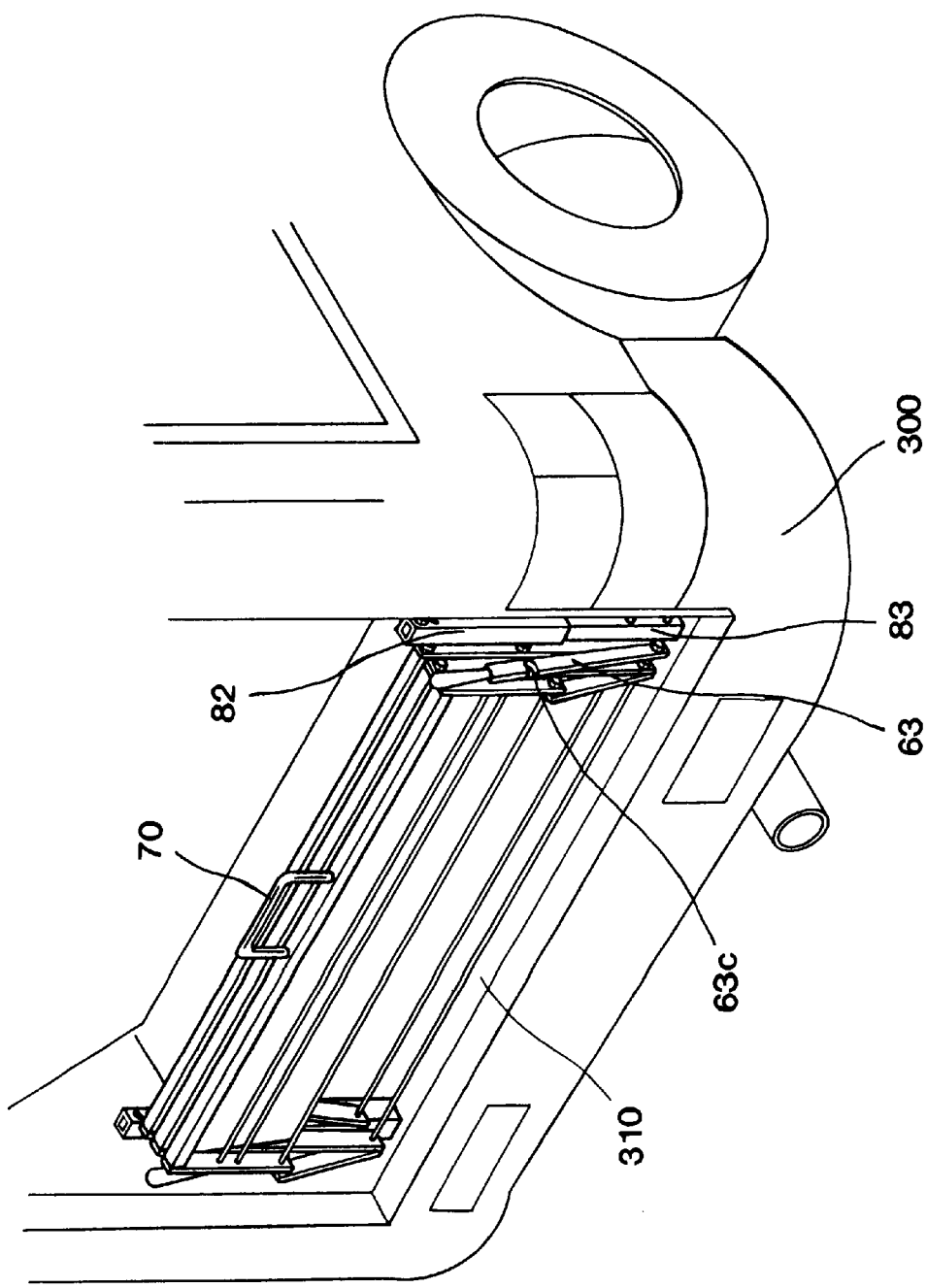
FIG. 17 is a perspective view of the folding staircase of FIG. 15 which is in a folded state.

Referring to FIGS. 15 and 16, the folding staircase according to the present embodiment is installed on a horizontal base such as the bottom 310 of a goods compartment of a utility vehicle such as a jeep 300 using a fixing unit 80.

Fixing members 81 are fixed to the bottom 310 of the goods compartment. Support members 81a for supporting a step portion in a folded state are perpendicularly combined with the fixing members 81. One end of each pivot bar 83 is pivotally coupled to respective brackets 81b.

Also, the upper end of each of the vertical link bars 42a of the upper-most step unit 20a is pivotally connected to one end of each connection member 82 by a screw 87. The other ends of the pivot bars 83 are inserted into hollows 82a of the connection members 82, whereby the connection members 82 combine with the pivot bars 83.

Slots 86 are formed on the connection members 82, respectively. Control bolts 85 fit into through holes 83a of the pivot bars 83 inserted into the hollows 82a of the connection members 82, through the slots 86, thereby controlling the depth to which the rotating bars 83 are inserted.

FIG. 16 shows the folding staircase according to the present embodiment in an extended state. In this state, the fixing lever 63 rotates to separate the combining pivot 46 from the hooking groove 63a. Then, the staircase can be pushed toward the fixing members 81 using the handle 70, thereby completing the folding of the staircase as shown in FIG. 17.

In this state, when the control bolts 85 are loosened, the pivot bars 83 completely insert into the hollows 82a of the connection members 82. Thus, the lower ends of the folded steps contact the bottom 310 of the goods compartment.

Preferably, the folded staircase can be bound with a chain or rope.

In order to extend the folded staircase, the control bolt 85 is driven with the steps being slightly raised, thereby fixing the pivot bars 83 to the connection members 82. After the folded steps are stretched by pulling the handle 70, the fixing llever 6363 pivots to combine the groove 63a to the combining pivot 45.

According to the present invention described above, a folding step portion and a fixing unit for fixing the step portion on a vehicle are adopted, so that the folding staircase can be easily installed and utilized. The folding staircase according to the present invention occupies a little space in a goods compartment. Also, the folding staircase can be installed in other transportation means such as automobile or an airplane.

What is claimed is:

1. A folding staircase comprising:

a plurality of adjacent step units each having a pair of horizontal link bars, a pair of vertically link bars pivotally coupled to said horizontal link bars, and a plate connected between said horizontal link bars wherein said adjacent step units are pivotally combined to form a step portion of said staircase; and a fixing unit for fixing said step portion to a vehicle, wherein said fixing unit comprising a pair of support members, each having a slot formed in a lengthwise direction thereon, to which said step portion is secured, a pair of guide members, each having an end pivotally and slidingly coupled with a bolt to said slot of each said support member, an upper bar installed between said guide members, a hook fixed at an arbitrary position of said upper bar, for combining with a hinge edge of a tailgate of said vehicle, and a bracket for fixing said hook to said upper bar.

2. The folding staircase of claim 1, further comprising a lower bar installed between said guide members parallel to said upper bar; a support bracket, having a slot, attached to said lower bar for receiving a free end of said tailgate; a screw passing through said slot of said support bracket into said lower bar, fixing said support bracket to said lower bar; and a screw clamp connecting to said support bracket for securing said support bracket to said tailgate.

3. The folding staircase of claim 2, further comprising a bracket secured to said upper bar for adjustably securing said hook to said upper bar.

4. The folding staircase of claim 2, wherein said support members have a hollow interior and include a top and a bottom end at least one hole therethrough, a respective ground member each having at least one adjustment hole therethrough, inserted into the bottom end of each of said hollow support member, and a respective hook member positioned through said at least one hole of each of said respective support member, and aligned with said at least one adjustment hole of each of said respective ground member, for fixing each of said respective ground member to each of said respective support member.

5. The folding staircase of claim 4, further comprising a respective lever interlocking with each of said hook member.

6. A folding staircase comprising:

a plurality of adjacent step units each having a pair of horizontal link bars, a pair of vertical link bars pivotally coupled to said horizontal link bars, and a plate connected between said horizontal link bars, wherein said adjacent step units are pivotally combined to form a step portion;

a fixing unit for fixing said step portion to a vehicle; and a fixing lever pivotally secured at one end to a pivot point of a horizontal and vertical link bar of said step portion, said fixing lever includes a hooking groove which removably secures to a horizontal and vertical link bar pivot point opposite said pivot point secured to said fixing lever, thereby keeping said step portion stable, wherein said fixing unit comprises a pair of support members, each having a slot formed in a lengthwise direction thereon, to which said step portion is secured, a pair of guide members, each having an end pivotally and slidingly coupled with a bolt to said slot of each said support member, an upper bar installed between said guide members, a hook fixed at an arbitrary position of said upper bar, for combining with a hinge edge of a tailgate of said vehicle, and a bracket for fixing said hook to said upper bar.

* * * * *